(12) United States Patent
Lam et al.

(10) Patent No.: US 7,566,026 B2
(45) Date of Patent: Jul. 28, 2009

(54) ONBOARD GUIDANCE METHOD FOR BALLISTIC MISSILES

(75) Inventors: Frank C. Lam, Tucson, AZ (US);
Gerald C. Chiang, Suhuarita, AZ (US)

(73) Assignee: Raytheon Company, Waltham, MA (US)

(*) Notice: Subject to any disclaimer, the term of this patent is extended or adjusted under 35 U.S.C. 154(b) by 13 days.

(21) Appl. No.: 11/392,131

(22) Filed: Mar. 29, 2006

(65) Prior Publication Data

US 2009/0127377 A1     May 21, 2009

(51) Int. Cl.
*F42B 15/01*     (2006.01)
*F42B 15/10*     (2006.01)
*G06F 19/00*     (2006.01)
*F42B 15/00*     (2006.01)

(52) U.S. Cl. ............... 244/3.15; 244/3.1; 244/3.16; 244/3.19

(58) Field of Classification Search ........... 244/3.1–3.3; 701/1, 3–13, 23–28, 200, 207, 213–216; 702/127, 150–154; 89/1.11; 342/61–65, 342/175, 190–197, 357.01–357.17
See application file for complete search history.

(56) References Cited

U.S. PATENT DOCUMENTS

| | | | | |
|---|---|---|---|---|
| 3,784,800 A | * | 1/1974 | Willoteaux | 244/3.15 |
| 4,234,142 A | * | 11/1980 | Yost et al. | 244/3.21 |
| 4,659,035 A | * | 4/1987 | Clendenning | 244/3.21 |
| 4,840,328 A | * | 6/1989 | Sundermeyer | 244/3.15 |
| 5,274,314 A | * | 12/1993 | Maqueira | 244/3.15 |
| 5,637,826 A | * | 6/1997 | Bessacini et al. | 244/3.11 |
| 5,762,290 A | * | 6/1998 | Dupont | 244/3.15 |
| 5,819,206 A | * | 10/1998 | Horton et al. | 701/207 |
| 5,828,571 A | * | 10/1998 | Bessacini et al. | 244/3.11 |

(Continued)

FOREIGN PATENT DOCUMENTS

DE     2226566     12/1972

(Continued)

OTHER PUBLICATIONS

A.K. Ghosh et al., "Trajectory Modelling of an Artillery Shell using Feed Forward Neural Networks"; IE(I) Journal—AS; vol. 84; Nov. 2003; pp. 47-49.*

(Continued)

*Primary Examiner*—Bernarr E Gregory
(74) *Attorney, Agent, or Firm*—Renner, Otto, Boisselle & Sklar, LLP

(57)     ABSTRACT

A guidance method for a powered ballistic missile involves using an onboard computer to numerically simulate the flight path of the missile in real time, using a model with at least 3 degrees of freedom. The results of this simulation are used to update in real time an aim point and/or a predicted intercept point. An iterative process may be used in adjusting the aim point and/or the predicted intercept point. The process may be carried out until a specified number of steps have been completed, and/or until a specified heading error threshold of the aim point and a specified time of flight threshold have been achieved. The use of real time updating of an aim point of the missile advantageously takes into account variations in missile velocity and position due to individual variations in the rocket motor of the missile.

19 Claims, 4 Drawing Sheets

U.S. PATENT DOCUMENTS

| | | | | |
|---|---|---|---|---|
| 6,006,145 | A | * | 12/1999 | Bessacini ..................... 244/3.1 |
| 6,125,308 | A | * | 9/2000 | Hills et al. .................. 244/3.11 |
| 6,186,441 | B1 | * | 2/2001 | Schneidereit .............. 244/3.11 |
| 6,259,974 | B1 | * | 7/2001 | Bessacini et al. ............. 244/3.1 |
| 6,666,410 | B2 | * | 12/2003 | Boelitz et al. ................ 244/3.2 |
| 6,714,845 | B2 | * | 3/2004 | Pinkos et al. ................ 244/3.1 |
| 6,726,146 | B2 | * | 4/2004 | Li et al. ..................... 244/3.15 |
| 6,808,139 | B1 | * | 10/2004 | Sturm ....................... 244/3.11 |

FOREIGN PATENT DOCUMENTS

| | | |
|---|---|---|
| DE | 3608108 | 6/1990 |
| WO | 9930102 | 6/1999 |
| WO | 9935460 | 7/1999 |

OTHER PUBLICATIONS

International Search Report from corresponding International Application No. PCT/US07/02467.

* cited by examiner

US 7,566,026 B2

ONBOARD GUIDANCE METHOD FOR BALLISTIC MISSILES

BACKGROUND OF THE INVENTION

1. Field of the Invention

The invention relates to the field of systems and method for guiding missiles.

2. Description of the Related Art

Guidance commands for surface-to-air missiles, such as standard missiles launched by AEGIS, are currently provided through an uplink. The missile is launched from a launch site, such as a ship, which tracks the missile, and provides guidance information in communication with the missile. Due to individual variations in the rocket motors of such missiles, it may be important to provide individualized guidance information during flight. Thus tracking of the missile and calculation of course corrections are performed at the launch site, and are communicated to the missile for use by the missile's guidance system. In the event of the loss of the communication uplink, the missile does not receive this guidance information, and lapses into casualty mode. In such a mode a missile continues flying without course corrections, or may be deliberately destroyed in order to prevent possible casualties or unwanted damage.

The disadvantages of this uplink-based system become more important as missiles with longer range are utilized. Therefore, it will be appreciated that there is room for improvement in missile guidance systems for surface-to-air missiles.

SUMMARY OF THE INVENTION

According to an aspect of the invention, a method of onboard guidance of a powered ballistic missile includes the steps of: in real time, during flight of the missile, and using an onboard computer on the missile, numerically simulating a flight path of the missile using a model with at least three degrees of freedom; and updating one or both of a predicted intercept point of the missile and an aim point of the missile, in real time and using the onboard computer, using results of the numerical simulation.

According to another aspect of the invention, a method of onboard guidance of a powered ballistic missile, includes iteratively in real time, in an onboard computer on board the missile: numerically simulating a flight path of the missile, using a model with at least three degrees of freedom, using current missile position and current missile velocity as inputs, and using an aim point as an input; if a heading error threshold is met and a time of flight threshold is met, forwarding an updated aim point to a guidance system of the missile; and if the heading error is greater than the heading error threshold, and if a predetermined number of iterations have not been performed, selecting a new aim point and performing a new iteration.

According to still another aspect of the invention, a ballistic missile includes: an inertial measurement unit that determines position and velocity of the missile in real time; and an onboard computer operatively coupled to the inertial measurement unit. The onboard computer includes: means for numerically simulating in real time a flight path of the missile using a model with at least three degrees of freedom; and means for updating in real a predicted intercept point of the missile and an aim point of the missile.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A method of onboard guidance of a powered ballistic missile involves using an onboard computer to numerically simulate the flight path of the missile in real time, using a model with at least 3 degrees of freedom. The results of this simulation are used to update an aim point of the missile and/or a predicted intercept point of the missile, in real time. An iterative process may be used in adjusting the aim point and/or the predicted intercept point. The process may be carried out until a specified number of steps have been completed, and/or until a specified heading error threshold of the aim point and a specified time of flight threshold have been achieved. The use of real time updating of an aim point of the missile advantageously takes into account variations in missile velocity and position due to individual variations in the rocket motor of the missile, such as variations in burn time and/or thrust. By moving all of the guidance functions onboard the missile, problems in communication with remote guidance facilities are avoided. The use of a 3-degree-of-freedom model in the iterative process allows efficient use of resources to improve the aim point of the missile, while providing results that are close to that of a full 6-degree-of-freedom simulation. The onboard computer for generating an improved aim point may either be used for primary guidance of the missile, or may be used as a backup for a remote guidance system, such as on a ship, for situations where communication with the remote guidance is interrupted or fails.

Figure 1:
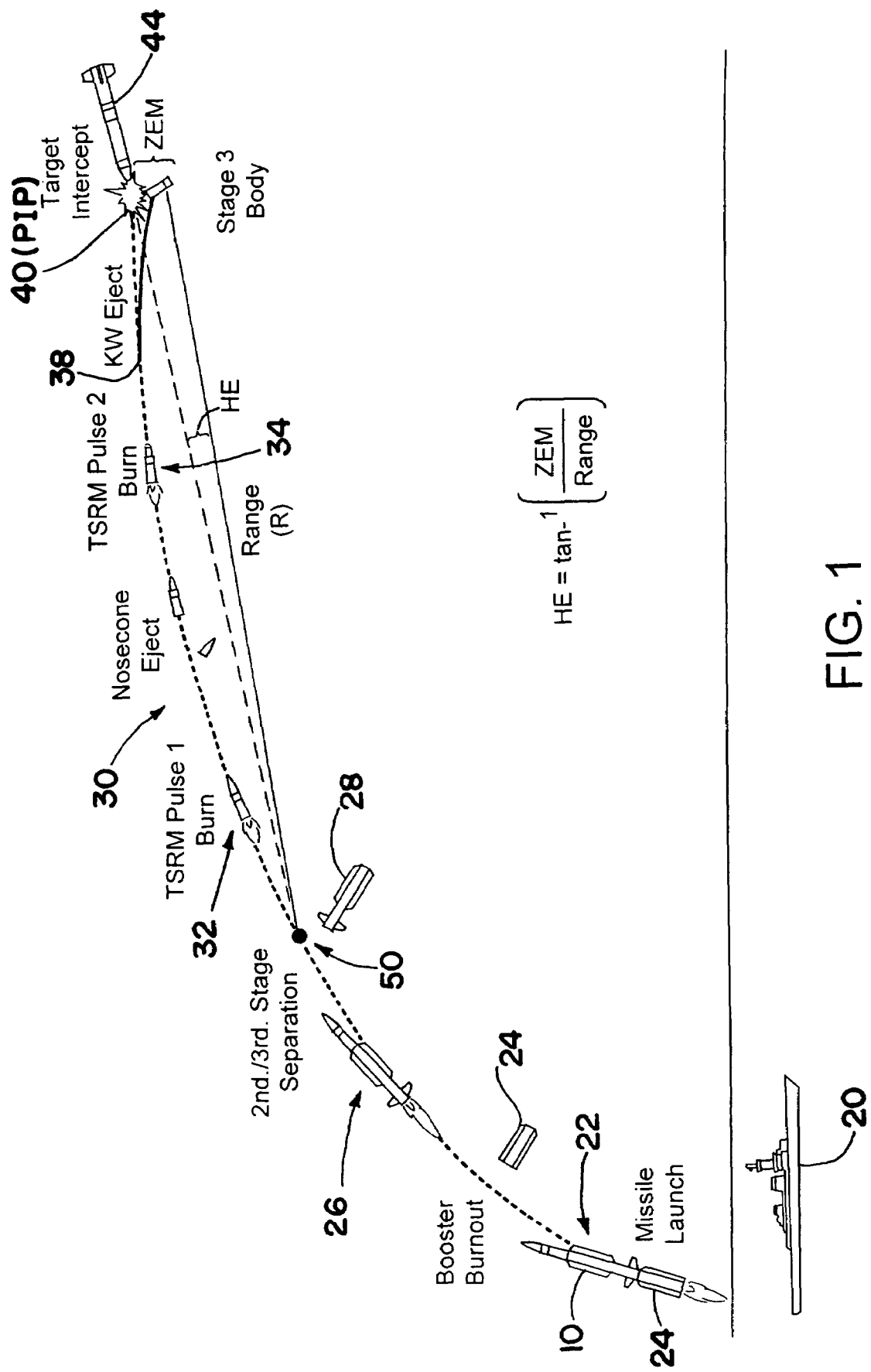
FIG. 1 is a schematic diagram showing flight of a missile controlled by a guidance method of the present invention.

FIG. 1 schematically shows the flight of a surface-to-air missile 10. The missile 10 is launched from a surface location, such as from a ship 20. During a boost phase 22, the missile 10 is rapidly accelerated using a first-stage booster 24 which burns out, and then is separated. A second-stage burn 26 then takes place. Following separation of the second stage 28, the missile 10 embarks on a ballistic phase of flight 30, which may include one or more pulse burns 32 and 34. Finally, a kinetic warhead 38 of the missile 10 reaches an intercept point 40 where it collides with a target 44, such as an incoming missile. The intercept point 40 may be a substantial distance away from the ship 20 or other launch site, for example, being hundreds of miles away. An example of the target 44 is an intercontinental ballistic missile (ICBM), which may be directed at a city for a military target.

FIG. 1 also illustrates the concept of a heading error in the course of the missile 10. At an example location 50 the missile 10 is at a range R from an initial predicted intercept point (PIP) with the target 44. Without course correction, that is, with zero effort put into course correction, the missile will actually end its ballistic trajectory by a zero effort miss (ZEM) amount. A heading error is defined as the inverse tangent of ZEM/R. This is the angle by which the missile 10 will miss the predicted intercept point (PIP) if no course correction is taken.

The predicted intercept point is provided to the missile 10 before launch from the ship 20 or other launch site. For situations where the target 44 is a long-range ballistic missile such as an ICBM, there is no need to alter this intercept point because of any changes in the trajectory of the target 44. This is because such targets do not normally change trajectory during flight. However, there is a need to provide guidance to the missile 10 to compensate for variations in the trajectory of the missile 10. These variations may be due, for example, to individual variations in thrust or burn time of certain parts of the missile 10, such as the first-stage booster 24, or in other powered stages of the missile. The missile 10 includes a guidance system for providing bursts of thrust or other means to alter the course of the missile 10. However, the guidance system of the missile 10 must be provided with information regarding what actions must be taken in order to correct the course of the missile 10.

Figure 2:
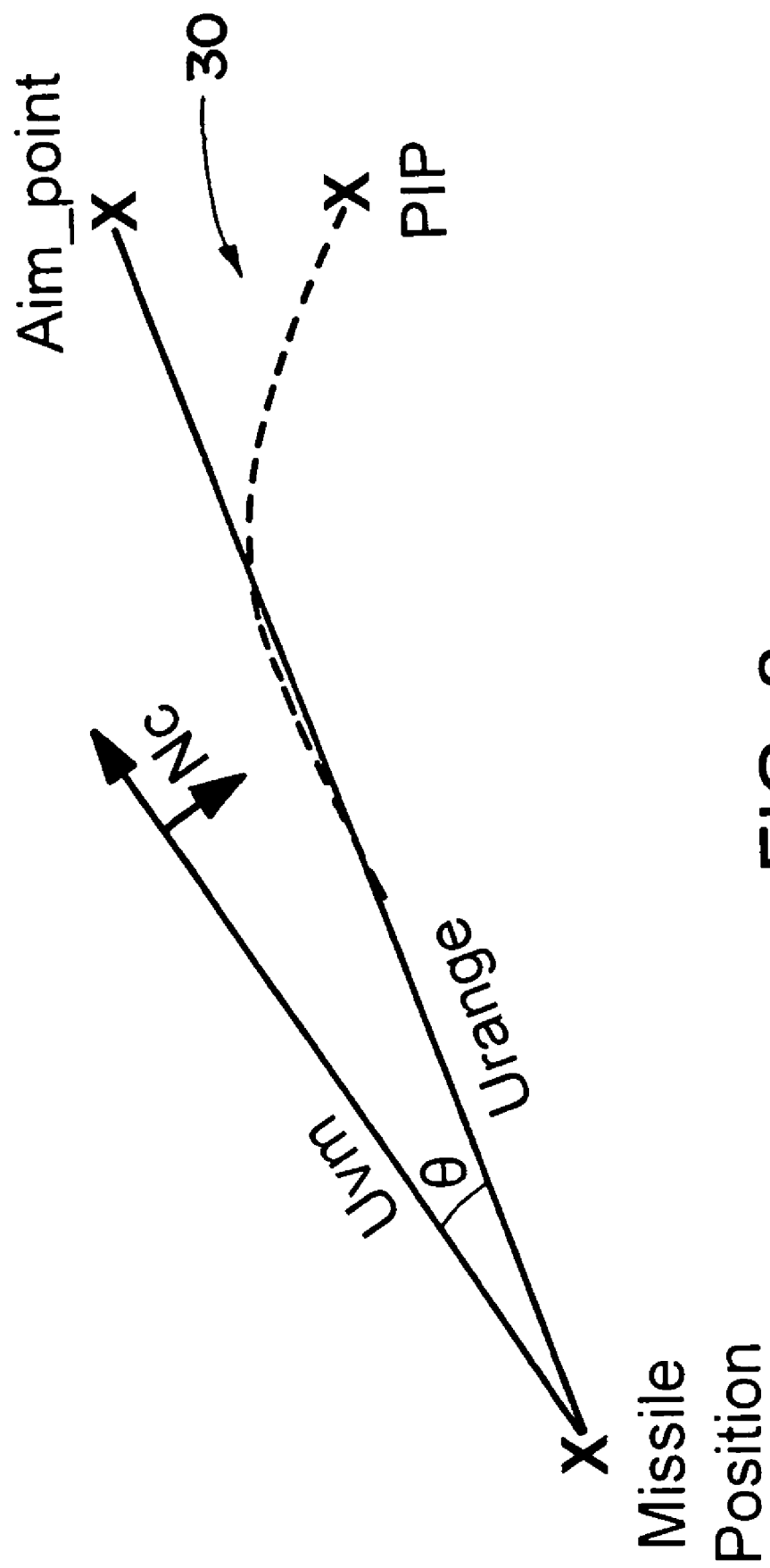
FIG. 2 is an illustration showing some of the parameters used in the guidance method of the present invention.

FIG. 2 illustrates some of the parameters used in an algorithm to place the missile on a desired course toward a specified aim point. The aim point is not in the same location as the predicted intercept point PIP, due to the ballistic flight portion 30. The range vector for the missile to the aim point may be expressed as:

$$\vec{R_{mi}} = \text{Aim\_point} - \text{Missile\_position} \quad (1)$$

The unit vector in the direction of the range vector is thus:

$$\vec{U_{range}} = \frac{\vec{R_{mi}}}{\|R_{mi}\|} \quad (2)$$

By defining a unit vector in the direction of the missile velocity as $U_{vm}$, the cosine of the angle between the missile velocity vector and the unit vector in the direction of the range of the aim point is:

$$\cos \theta = \vec{U_{vm}} \cdot \vec{U_{range}} \quad (3)$$

The acceleration commands given by the guidance system to correct the course of the missile can thus be expressed as:

$$N_c = -K(\vec{U_{vm}} \cos \theta - \vec{U_{range}}) \quad (4)$$

In equation (4) $N_c$ is a guidance acceleration command and K is a time-varying gain that may be adjusted for shaping purposes.

Figure 3:
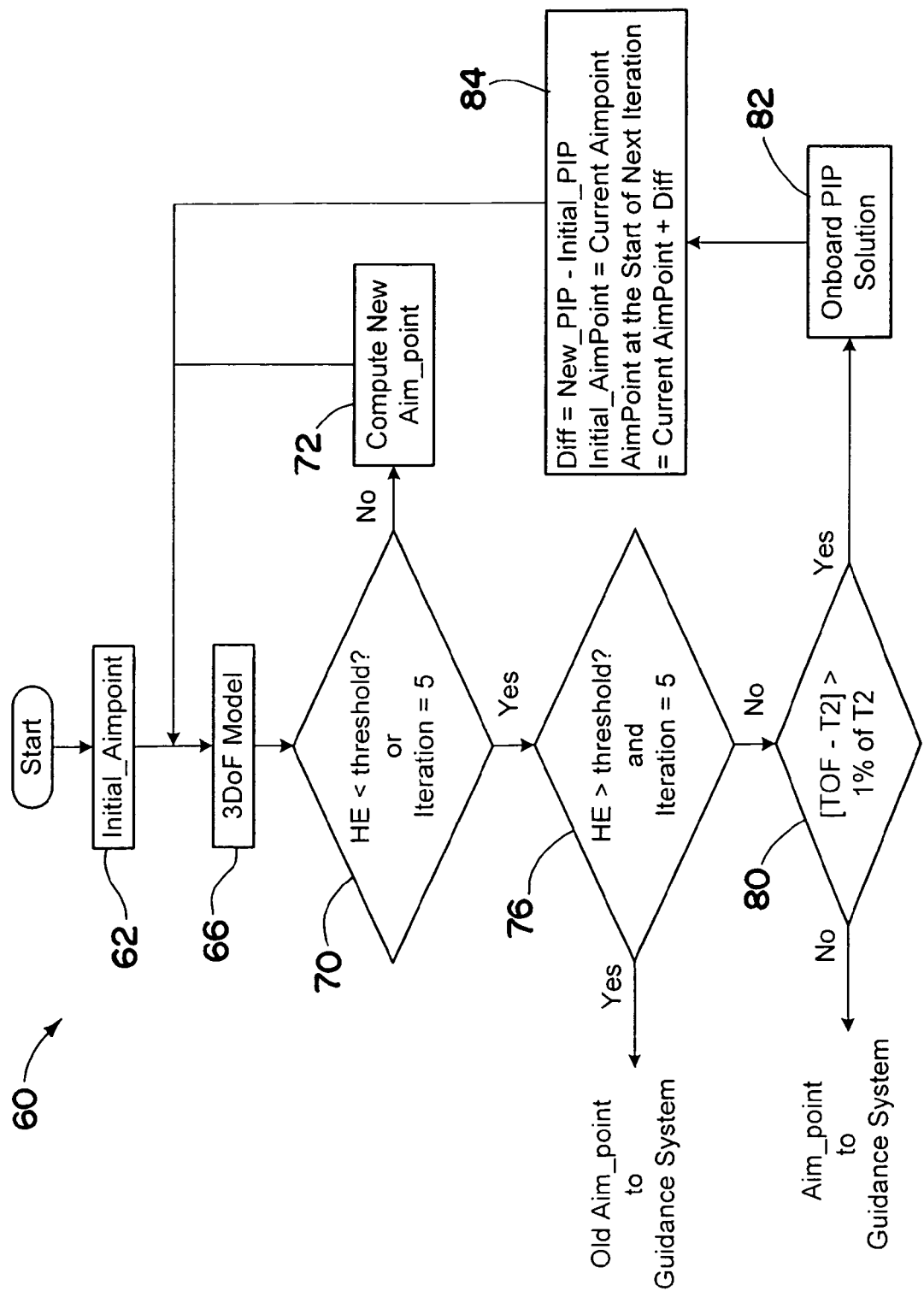
FIG. 3 is a high-level flow chart showing various steps of the guidance method of the present invention.

FIG. 3 shows a flow chart of a method 60 of calculating guidance corrections in an onboard computer onboard the missile 10 (FIG. 1). The method 60 begins by providing an initial aim point 62 as an input for performing a flight path numerical simulation 66 utilizing a model with at least 3 degrees of freedom. The initial aim point is an aim point that is provided prior to or at launch of the missile, or as the result of a previous calculation. The numerical simulation 66 also utilizes the current missile position and velocity as inputs. As will be described in greater detail later, the missile position and missile velocity may be determined from onboard sensors of the missile 10. The initial aim point is based on reaching the PIP using an estimated time of flight, based on a nominal rocket motor burn and target tracking information. In the numerical simulation 66, a 3-degree-of-freedom aim point search model is used to estimate an aim point based on the real time missile position and velocity. This trajectory differs from the currently-used PIP by a heading error HE.

In step 70 an examination is made as to whether this heading error is less than a heading error threshold. If the calculated heading error is not less than the heading error threshold, and the iterative process has not reached a predetermined number of iterations for terminating the process (shown in the Figure as 5 iterations), a new aim point is computed. This new aim point is an adjustment of the initial or previous aim point, with an adjustment based on the magnitude and direction of the heading error calculated from the numerical simulation 70. The computation of this new aim point is performed in step 72. The process then returns to performing the numerical simulation 66 again. This iterative process continues until the heading error threshold is met, or until the limit of iterations is reached.

Reference made herein to a threshold being met is intended to refer to situations where an examination is actually made as to whether a predetermined threshold is satisfied. Where no check is made regarding satisfaction of a threshold, the threshold is not considered as "met," as the term is used herein.

The numerical simulation 66 utilizes a time stepping process to simulate substantially all of the remaining flight of the missile. This includes both the powered portions of the missile flight and the ballistic flight portion 30 (FIG. 1). The numerical model for the numerical simulation 66 contains aerodynamic subroutines that simulate performance of a trimmed missile. Drag coefficients for the model are determined through table lookups for different stages of the missile. Once the overall drag of the missile 10 is calculated, it is taken out from the rocket motor thrust to determine the boosting capability during each stage. Gravity effects are also included in the model to get the missile acceleration, which is updated at every time step. The model of numerical simulation 66 includes accurate modeling of nominal rocket motors. As the flight continues this nominal rocket motor information is superseded by the actual position and velocity data from the missile.

If the iteration limit is exceeded without the heading error threshold being met, then in step 76 the initial aim point from step 62 is sent on to the flight computer of the missile's guidance system. This outcome represents a situation where the iterative process of the method 60 was unable to find a better aim point than what was previously available (at the start of the iterative process).

If the heading error threshold is met, then a further decision point occurs in step 80. A time of flight (TOF) threshold is applied to the solution, so that only if 1) the heading error threshold has been met, and 2) the difference between the estimated time of flight and the TOF of the numerical solution is less than the TOF threshold, will the aim point be sent to the flight computer. If the difference is greater than the TOF threshold, a new PIP will be computed, along with a new aim point based on that new PIP. This will occur in steps 82 and 84. The new PIP and the new aim point will be sent back for further simulation in the numerical model of step 66. The checking of the time of flight threshold advantageously allows the method to accommodate situations where alterations in expected time of flight occur from what was initially expected. For example, a longer-than-expected rocket motor firing would result in the missile 10 reaching the area of the target sooner, with a shift in the predicted intercept point needed to compensate for this.

In a particular embodiment, the method 60 may be performed on the order of every 5 seconds, to update the course of the missile while in flight. It will be appreciated that the ability to perform calculations and update the course of the missile in real time is advantageous in getting the missile to a proper intercept point. Further, it will be appreciated that good accuracy is desired in making course corrections, as it is beneficial to make course corrections early, during the powered early phases of the flight of the missile 10. Corrections become more difficult the closer the missile 10 is to the target 44, and may become next to impossible once the missile is in the ballistic phase 30 of its flight.

Figure 4:
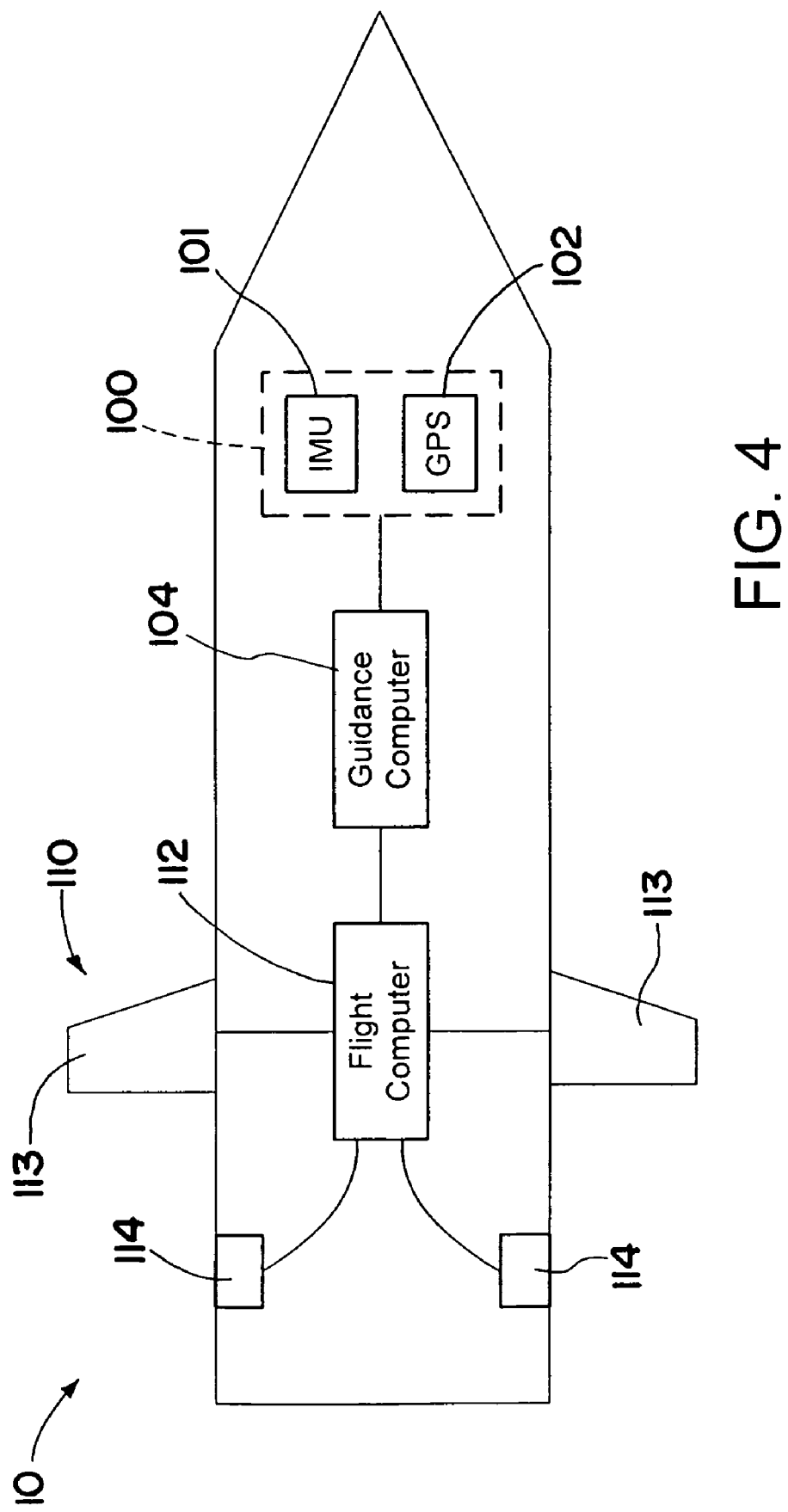
FIG. 4 is a schematic diagram of a missile that utilizes the onboard guidance system of the present invention.

FIG. 4 schematically shows some of the systems of the missile 10 that are involved in performance of the method 60. As mentioned above, a series of sensors 100 may be used to determine missile position and/or velocity. The sensors 100 may include well-known devices such as inertial measurement units 101 and global positioning systems 102. The sensors 100 are coupled to a guidance computer 104 in which the method 60 is performed. The steps of the method 60 may be embodied in any of a variety of well-known structures within the guidance computer 104. The steps of the method 60 may be embodied in hardware or software, on any of a variety of integrated circuits or other circuits, as appropriate. Results from the method 60 are forwarded from the guidance computer 104 to a guidance system 110, which includes a flight computer 112 that is operatively coupled to force-producing units such as control surfaces (tail fins) 113, or thrusters 114. The flight computer 112 utilizes information received from the guidance computer 104 selectively to position the control surfaces 113 and/or to fire the thrusters 114 to alter the course of the missile 10. The flight computer may also be coupled to an antenna 120 for communication with ground systems, such as those onboard the ship 20 (FIG. 1).

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of onboard guidance of a powered ballistic missile, the method comprising:
    in real time, during flight of the missile, and using an onboard computer on the missile, numerically simulating a flight path of the missile using a model with at least three degrees of freedom;
    updating one or both of a predicted intercept point of the missile and an aim point of the missile, in real time and using the onboard computer, using results of the numerical simulation;
    providing guidance information from the onboard computer, based on the numerically simulating and the updating, to a guidance system of the missile; and
    controlling a course of the missile using the guidance system.

2. The method of claim 1, wherein the updating includes updating both the predicted intercept point and the aim point.

3. The method of claim 2, wherein the updating includes updating the aim point such that a heading error between a trajectory of the missile and the predicted intercept point, is below a predetermined heading error threshold.

4. The method of claim 3, wherein the updating includes updating the predicted intercept point if a calculated predicted time of flight exceeds an initial predicted time of flight by a predetermined time of flight threshold.

5. The method of claim 1, wherein the numerically simulating includes numerically simulating substantially all of the remainder of the flight path, including both a powered phase of flight and a ballistic phase of flight.

6. The method of claim 1,
    further comprising determining current missile position and current missile velocity from sensors on the missile;
    wherein the numerically simulating includes using the current missile position and the current missile velocity as inputs.

7. The method of claim 1, further comprising iteratively numerically simulating the flight path and updating one or more of the predicted intercept point of the missile and the aim point of the missile.

8. The method of claim 7, wherein the iteratively numerically simulating and the updating until 1) both a heading error threshold is met and a time of flight threshold is met, or 2) a predetermined number of iterations have been performed without the heading error threshold being met.

9. The method of claim 8, wherein, if the heading error threshold is met and the predicted time of flight threshold is met, the providing information includes sending an updated aim point to the guidance system of the missile.

10. The method of claim 9, further comprising, if the heading error threshold is met and the predicted time of flight threshold is not met, updating the predicted intercept point.

11. The method of claim 8, wherein, if the predetermined number of iterations have been performed without the heading error threshold being met, the providing information includes sending a previous aim point to the guidance system.

12. A method of onboard guidance of a powered ballistic missile, the method comprising:
    iteratively in real time during flight of the missile, in an onboard computer on board the missile:
        numerically simulating a flight path of the missile, using a model with at least three degrees of freedom, using current missile position and current missile velocity as inputs, and using an aim point as an input;
        if a heading error threshold is met and a time of flight threshold is met, forwarding an updated aim point to a guidance system of the missile; and
        if the heading error is greater than the heading error threshold, and if a predetermined number of iterations have not been performed, selecting a new aim point and performing a new iteration; and
    controlling a course of the missile using the guidance system;
    wherein the guidance system uses a received aim point received from the onboard computer in the controlling the course of the missile; and wherein if the heading error threshold is met and the time of flight threshold is met, the received aim point is the undated aim point.

13. The method of claim 12, further comprising, if the heading error threshold is met and the predicted time of flight threshold is not met, updating the predicted intercept point.

14. The method of claim 12, further comprising, if the predetermined number of iterations has been performed, sending a previous aim point to the guidance system of the missile.

15. The method of claim 12, further comprising determining the current missile position and the current missile velocity from sensors on the missile.

16. The method of claim 12, wherein the numerically simulating includes simulating both a powered phase of flight and a ballistic phase of flight.

17. A ballistic missile comprising:
an inertial measurement unit that determines position and velocity of the missile in real time; and
an onboard computer operatively coupled to the inertial measurement unit, wherein the onboard computer includes:
means for numerically simulating in real time a flight path of the missile using a model with at least three degrees of freedom; and
means for updating in real time a predicted intercept point of the missile and an aim point of the missile.

18. The missile of claim 17,
further comprising a guidance system that selectively alters course of the missile;
wherein the onboard computer is operatively coupled to the guidance system.

19. The missile of claim 17, wherein the means for numerically simulating includes means for simulating both a powered phase of flight and a ballistic phase of flight.

* * * * *